Dec. 23, 1969     R. H. MILLER     3,485,096

RAINFALL MEASURING DEVICE

Filed Sept. 30, 1968

INVENTOR.
ROBERT H. MILLER
BY *Naylor & Neal*
ATTORNEYS 3,485,096
RAINFALL MEASURING DEVICE
Robert H. Miller, 1937 Capistrano Ave.,
Berkeley, Calif. 94707
Filed Sept. 30, 1968, Ser. No. 763,630
Int. Cl. G01w 1/14
U.S. Cl. 73—171                 5 Claims

ABSTRACT OF THE DISCLOSURE

A gauge having a beam pivotally mounted on a fulcrum for swinging movement in a generally vertical plane, a counterweight on the beam to one side of the fulcrum, and a collection cup on the beam to the other side of the fulcrum. The counterweight is disposed to normally maintain the cup in an upper position and, upon the accumulation of water in the cup to a predetermined level, permit the cup to move to a lower position. A syphon communicates with the cup to automatically effect the discharge of water therefrom upon movement of the cup to the lower position and is disposed so that it primes only upon lowering of the cup from the upper position.

Background of the invention

The present invention relates to the art of measuring rainfall and, more particularly, is directed to a device for automatically measuring rainfall over an extended period of time. It is especially concerned with such a device suited for coupling to a counter for recording the total rainfall over any desired time and for coupling to a recording device to continuously record the rate of rainfall.

Prior art rain gauges of the general type to which the present invention pertains all rely upon a rainfall accumulation reservoir which is periodically emptied. Certain of these employ rather complex and delicately mounted pairs of teetering reservoirs which, alternatively, fill and empty. Patent No. 3,243,999 discloses a gauge of this type. Others employ stationary reservoirs with syphons to effect their emptying upon the accumulation of water therein to a predetermined level. Patents Nos. 2,735,298 and 2,908,165 disclose gauges of the latter type. Gauges of the type employing teetering reservoirs are characterized as being relatively accurate, but have the disadvantage of being quite complex and delicate. Those of the type employing fixed reservoirs with syphon discharge are also characterized as being rather complex. The latter type also have the disadvantage that the syphons tend to permit the "trickle" discharge of accumulated water. This results because the syphons do not become fully primed during periods of slow water accumulation. It is a particularly undesirable characteristic, because it permits water to escape from the reservoir without any recordation.

Summary of the invention

Basically, the invention relates to an improvement in a rainfall measuring device of the type comprising a base member, a lever pivotally mounted on the base member for swinging movement relative thereto through a generally vertical plane, a collection cup secured to the lever in spaced relationship to its pivotal mounting and, counter balance means associated with the lever to normally maintain the cup in an upper position and permit its movement to a lower position upon the accumulation of water therein to a predetermined level. The improvement comprises a syphon of generally inverted U-shaped configuration having one end in fluid communication with a lower portion of the cup, the other end disposed exteriorly with the cup at a level below said lower portion when the cup is in either the upper or the lower position, and a bight portion disposed to be above the predetermined water level when the cup is in the upper position and below the predetermined level when the cup is in the lower position.

The invention is also concerned with a rainfall measuring device having a collection cup supported on a counter balanced beam disposed for swinging movement about a fulcrum spaced therebeneath and having adjustable stop means to selectively limit the degree of swinging movement of the beam about the fulcrum in either direction.

It is, accordingly, a principal object of the invention to provide a rainfall measuring device which avoids the afore-noted shortcomings of the prior art.

Another and more specific object of the invention is to provide a rainfall measuring device having an improved siphon discharge for the collection cup employed therein which is not subject to "trickle" discharge prior to its full priming.

Still another object of the invention is to provide a rainfall measuring device employing an improved fulcrum support for its collection cup to provide for positive tilting of the cup to a discharge position upon its filling to a predetermined level. With respect to this object, it is another object of the invention to provide a fulcrum support for the collection cup having adjustable means to selectively limit the pivotal movement of the cup about the fulcrum point.

These and other objects will become more apparent from the following detailed description.

Description of the illustrated embodiment

Figure 1:
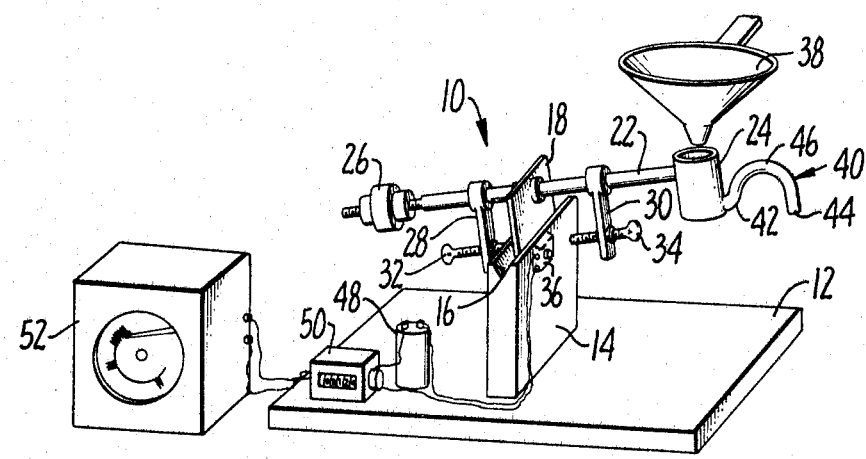
FIG. 1 is a perspective view illustrating the inventive device in its entirety with the collection cup disposed in the upper position.

In the drawings, the numeral 10 designates the collection mechanism of the inventive measuring device in its entirety. The mechanism comprises, as its basic element, a base member 12 having an upstanding fulcrum support 14 fixed thereto. A fulcrum notch 16 is formed in the upper end of the support. The support 14 pivotally mounts a fulcrum member 18 having a knife-like lower edge 20 received in the notch 16. A beam 22 is fixed to the member 18 and extends to either side thereof. In the preferred embodiment illustrated, the beam extends substantially normal to the member 18 and is spaced upwardly from the lower edge 20. The beam is thus mounted for swinging movement in a generally vertical plane about the fulcrum point defined between the notch 16 and the edge 20.

The spaced interrelationship of the beam and fulcrum point provided for balance of the beam in a condition of unstable equilibrium. This, as will become more apparent from the subsequent discussion, results in positive tipping action whenever the balanced condition is reached.

The beam 22 has a collection cup 24 fixed to one of its ends in an upright position and a counterweight 26 threadably received on its other end for longitudinal adjustment relative thereto. Stop arms 28 and 30 are also fixed to the beam 22 and depend therefrom to either side of the support 14. The arms 28 and 30 threadably receive adjustable stop screws 32 and 34, respectively. The screw 32 is disposed for engagement with the support 14 to limit swinging movement of the beam in a counterclockwise direction, as viewed in the drawings. The screw 34 is disposed for engagement with a switch 36 mounted on the support to limit swinging movement of the beam in a clockwise direction, as viewed in the drawings, and also effect activation of the switch. By adjustment of the screws 32 and 34 in the stop arms, the degree of swinging movement of the beam in either direction may be selectively varied. In the preferred embodiment, the switch 36 is of a relatively conventional limit type and normally spring-biased to an open position. The screw 34 is disposed to close and open the switch upon engagement and disengagement, respectively, therewith.

In operation, the collection cup 24 is disposed so as to be exposed to rainfall and collect water therein. Ideally, a funnel is disposed above the cup so as to multiply the rate at which water is collected therein. Such a funnel is designated in the drawings by the numeral 38. It may be supported on any suitable structure.

The basic structure of the collection mechanism is completed by a siphon tube 40 of generally inverted U-shape configuration having one end 42 in fluid communication with the lower portion of the cup, an open distal end 44 disposed exteriorly of the cup, and an elevated bight portion 46.

Figure 2:
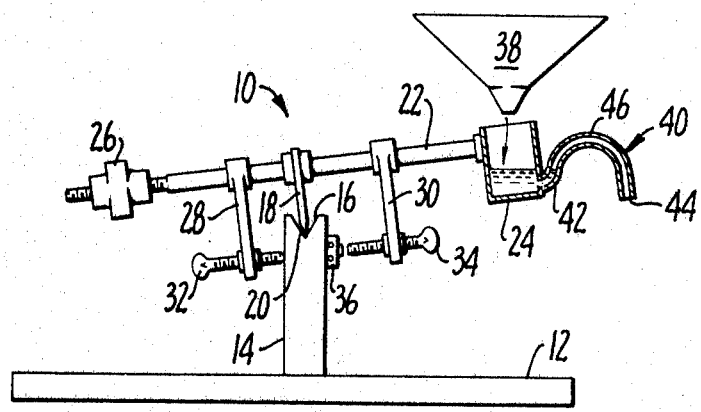
FIG. 2 is an elevational view, partly in section, illustrating the inventive device with the collection cup in the upper position and in the process of accumulating water.
Figure 3:
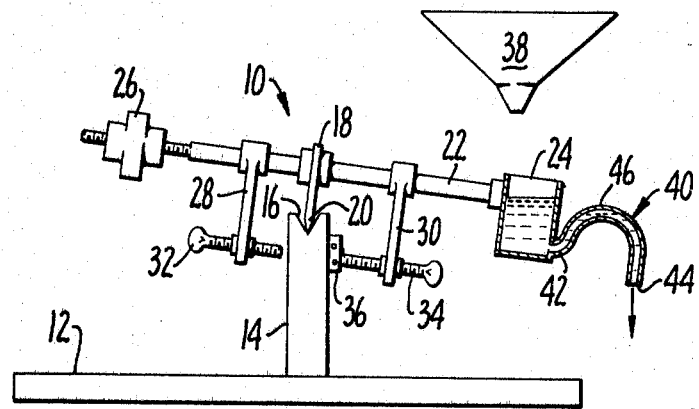
FIG. 3 is an elevational view similar to FIG. 2, but illustrating the collection cup in the lower position in the process of discharging water.

The counterweight 26 is adjusted to normally maintain the cup 24 in an upper position, as illustrated in FIGS 1 and 2, and to permit the cup to swing to a lower position, as illustrated in FIG. 3, upon the accumulation of water therein to a predetermined level. When properly adjusted, the stops 32 and 34 are positioned to dispose the bight portion 46 at a level above the predetermined water level when the cup is in the upper position and below the predetermined level when the cup is in the lower position. This characteristic is highly advantageous, since it provides for the maintenance of the siphon in an unprimed condition until the cup moves to the lower position and, upon the assumption of this position, provides for the immediate priming of the siphon. Priming of the siphon functions to drain the water from the cup and permit its return to the upper position. The distal end 44 of the siphon is disposed so as to be beneath the lower portion of the cup 24 when it is in both the upper and lower positions. Thus, once the siphon is primed, it functions to exhaust water from the cup even after it is returned to the upper position. The balance of the beam 22 is such that the cup normally returns to the upper position before it is completely empty.

The switch 36 is wired in series with a battery 48 and a counter 50 so that each time the switch is closed the counter advances one unit. Through this arrangement, the counter functions to indicate the cumulative rainfall collected in the cup 24. Through suitable calibration of the cup 24 and counter 50, it is possible to make the counter read directly in inches of rainfall. If the cup and counter are not so calibrated, the counter reading may be readily converted into inches of rainfall by conventional calculations.

In the illustrated embodiment, a time recorder 52 is also wired in series with the switch 36 to record the rate of rainfall sensed by the mechanism 10. The recorder 52 may be of any suitable graphic type. Typically, it would simply record the number of times the cup 24 lowered per unit of time.

From the foregoing description, the operation of the present invention and its advantages are believed apparent. It is emphasized that the mechanism of the invention provides a means wherein triggering is positively effected each time a predetermined quantity of rainfall is collected. This positive action is coupled with the positive discharge provided by the siphon 40 responsive to each triggering action. The mechanism is uniquely characterized in that it is capable of finite adjustment, while at the same time of simple and durable construction.

I claim:
1. In a rainfall measuring device comprising:
   (a) a base member;
   (b) a lever pivotally mounted on said base member for swinging movement relative thereto through a generally vertical plane;
   (c) a collection cup secured to said lever in spaced relationship to the pivotal mounting of said lever to said base member; and,
   (d) counterbalance means operatively associated with said lever to normally maintain said cup in an upper position and, upon the accumulation of water therein to a predetermined level, permit said cup to move to a lower position, the improvement comprising a siphon of generally inverted U-shaped configuration having one end in fluid communication with a lower portion of said cup, the other end disposed exteriorly of said cup at a level below said lower portion when said cup is in either the upper or the lower position, and a bight portion disposed to be above said predetermined level when said cup is in the upper position and below said predetermined level when said cup is in the lower position.

2. A rainfall measuring device comprising:
   (a) an upstanding base member;
   (b) a beam extending across said base member;
   (c) means supporting said beam on said base member for swinging movement through a generally vertical plane about a fulcrum point spaced therebeneath;
   (d) a collection cup secured to said beam to one side of said fulcrum point;
   (e) a counterbalance weight secured to said beam for select longitudinal adjustment relative thereto to the other side of said fulcrum point, said weight being adapted to normally maintain said cup in an upper position and, upon the accumulation of water therein to a predetermined level, permit said cup to move to a lower position;
   (f) interengageable stop means carried, respectively, by said base member and beam to limit swinging movement of said beam in either direction about said fulcrum point, said means being adustable to selectively vary the degree of swinging movement in either direction; and,
   (g) a siphon of generally inverted U-shaped configuration having one end in fluid communication with a lower portion of said cup, the other end disposed exteriorly of said cup at a level below said lower portion when said cup is in either the upper or the lower position, and a bight portion disposed to be above said predetermined level when said cup is in the upper position and below said predetermined level when said cup is in the lower position.

3. A rainfall measuring device according to claim 2 further comprising counting means disposed for operation responsive to swinging movement of said beam to record the number of times said cup moves from the upper position to the lower position.

4. A device according to claim 3 wherein said counting means comprises:
   (a) an electrically operated counter; and, (b) an electrical switch electrically coupled to said counter and operatively associated with said beam to effect the triggering of said counter responsive to swinging of said beam.

5. A rainfall measuring device according to claim 2 further comprising means disposed for operation responsive to swinging movement of said beam to record the frequency with which said cup moves from the upper position to the lower position.

References Cited

UNITED STATES PATENTS

| | | | |
|---|---|---|---|
| 2,202,452 | 5/1940 | Hildabrand | 73—171 |
| 2,468,692 | 4/1949 | Stevens | 73—171 |
| 2,789,431 | 4/1957 | Wong | 73—171 |

RICHARD C. QUEISSER, Primary Examiner

E. J. KOCH, Assistant Examiner